US009342942B2

(12) United States Patent
Yoon et al.

(10) Patent No.: US 9,342,942 B2
(45) Date of Patent: May 17, 2016

(54) BILL-RECYCLING ATM FOR TELLER WITH SUPPLEMENTARY COLLECTION BOX AND BANKNOTE TRANSFER METHOD APPLIED THERETO

(71) Applicant: Nautilus Hyosung Inc., Seoul (KR)

(72) Inventors: Young Jin Yoon, Seoul (KR); Sang Hwan Kweon, Gunpo-si (KR)

(73) Assignee: NAUTILUS HYOSUNG INC., Seoul (KR)

(*) Notice: Subject to any disclaimer, the term of this patent is extended or adjusted under 35 U.S.C. 154(b) by 0 days.

(21) Appl. No.: 14/473,626

(22) Filed: Aug. 29, 2014

(65) Prior Publication Data

US 2015/0363991 A1 Dec. 17, 2015

(30) Foreign Application Priority Data

Jun. 12, 2014 (KR) ........................ 10-2014-0071603

(51) Int. Cl.

| | |
|---|---|
| ***G06Q 40/00*** | (2012.01) |
| ***G07D 11/00*** | (2006.01) |
| ***B65H 7/20*** | (2006.01) |
| ***B65H 33/14*** | (2006.01) |
| ***B65H 31/24*** | (2006.01) |
| ***G07F 19/00*** | (2006.01) |

(52) U.S. Cl.

CPC ................ *G07D 11/006* (2013.01); *B65H 7/20* (2013.01); *B65H 31/24* (2013.01); *B65H 33/14* (2013.01); *G07D 11/0006* (2013.01); *G07D 11/0033* (2013.01); *G07D 11/0045* (2013.01); *G07D 11/0072* (2013.01); *G07F 19/202* (2013.01); *G07F 19/203* (2013.01)

(58) Field of Classification Search

CPC ..... G06F 19/20; G06F 19/202; G06F 19/203; G06F 19/205

USPC .......................................... 235/379, 380, 382

See application file for complete search history.

(56) References Cited

U.S. PATENT DOCUMENTS

| | | | | |
|---|---|---|---|---|
| 7,090,121 | B2 * | 8/2006 | Wanibe et al. | 235/379 |
| 7,353,989 | B1 * | 4/2008 | Block et al. | 235/379 |
| 2014/0027355 | A1 * | 1/2014 | Kumagai | 209/534 |
| 2014/0318925 | A1 * | 10/2014 | Lee et al. | 194/206 |
| 2014/0332340 | A1 * | 11/2014 | Adachi et al. | 194/206 |

* cited by examiner

*Primary Examiner* — Daniel St Cyr

(74) *Attorney, Agent, or Firm* — Fenwick & West LLP

(57) ABSTRACT

The present invention relates to a bill-recycling automated teller machine (ATM) for a teller with a supplementary collection box and a banknote transfer method applied thereto, and more particularly, to a bill-recycling ATM for a teller with a supplementary collection box and a banknote transfer method applied thereto, in which in configuring the ATM for a teller used when the teller performs a banking transaction at a counter, as the supplementary collection box for replenishing or collecting banknotes is provided in the ATM, a large quantity of banknotes can be promptly replenished into or collected from banknote cassettes through the supplementary collection box, and, at the same time, when a settlement work is performed, an automatic settlement can be performed by counting banknotes through a banknote discriminating unit provided on a transporting path in a process of transporting the banknotes stored in the banknote cassettes to the supplementary collection box.

4 Claims, 6 Drawing Sheets

BILL-RECYCLING ATM FOR TELLER WITH SUPPLEMENTARY COLLECTION BOX AND BANKNOTE TRANSFER METHOD APPLIED THERETO

CROSS-REFERENCE TO RELATED APPLICATIONS

This application claims the benefit of priority to Korean Patent Application No. 10-2014-0071603, filed on Jun. 12, 2014, which is incorporated by reference herein in its entirety.

BACKGROUND OF THE INVENTION

1. Field of Invention

The present invention relates to a bill-recycling automated teller machine (ATM) for a teller with a supplementary collection box and a banknote transfer method applied thereto, and more particularly, to a bill-recycling ATM for a teller with a supplementary collection box and a banknote transfer method applied thereto, in which in configuring the ATM for a teller used when the teller performs a banking transaction at a counter, as the supplementary collection box for replenishing or collecting banknotes is provided in the ATM, a large quantity of banknotes can be promptly replenished into or collected from banknote cassettes through the supplementary collection box, and, at the same time, when a settlement work is performed, an automatic settlement can be performed by counting banknotes through a banknote discriminating unit provided on a transporting path in a process of transporting the banknotes stored in the banknote cassettes to the supplementary collection box. In addition, when banknotes are fully stacked in a specific banknote cassette while the ATM is operating, banknotes of a corresponding denomination can be stored in the supplementary collection box instead of the fully stacked banknote cassette, and even when banknotes of special denominations other than major denominations are deposited, the special denominations other than the major denominations can be handled by storing the deposited banknotes of special denominations in the supplementary collection box, thereby enabling operability of the ATM for a teller to be improved and convenience of the teller in performing a banking transaction to be enhanced.

2. Description of the Related Art

Generally, an Automated Teller Machine (ATM) is an automated apparatus which can support basic banking services such as deposits or withdrawals without a bank clerk regardless of time and space in relation to a banking service, and is configured to automatically perform a transaction such as a withdrawal or deposit of banknotes using a medium such as a bank card or a passbook of a customer.

In addition, ATMs for a teller used by a teller who processes a banking work at a counter of a bank are actively adopted recently in order to improve convenience and efficiency of a work of the teller, and has been disclosed, for example, in Japanese Laid-open Patent No. 2008-134863 entitled “ATM used at a counter”.

That is, an ATM for a teller is provided at a counter where a teller works at all times, thereby allowing banknotes to be deposited or withdrawn when the teller performs a banking work or other works such as a settlement or the like to be performed.

In operating such an ATM for a teller, when banknotes in a banknote cassette provided in the ATM are insufficient and need to be replenished or banknotes in a banknote cassette are stacked more than a reference quantity and need to be collected, a separate banknote replenishing/collecting clerk performs a work of replenishing and collecting banknotes into or from the ATM. Since a conventional ATM for a teller is configured to replenish or collect banknotes into or from the banknote cassettes through a deposit and withdrawal unit, when a large quantity of banknotes are replenished or collected, the banknotes should be replenished or collected in parts divided as much as the capacity of the deposit and withdrawal unit. Therefore, there is a problem in that the work of replenishing and collecting banknotes is troublesome, and efficiency of the work is lowered since a lot of time is required.

In addition, since an ATM for a teller mainly performs a deposit work due to the nature of the work of the teller at a counter unlike an unmanned ATM which performs withdrawal works in most cases, banknotes of a specific denomination are generally deposited and intensively stored in a corresponding banknote cassette. Therefore, when the banknotes are fully stacked in the corresponding banknote cassette, a conventional ATM for a teller stops operation and calls a banknote replenishing/collecting clerk to perform a work of collecting the banknotes stacked in the banknote cassette, and thus, there is a problem in that operability of the ATM is lowered.

Further, since it is sometimes requested to deposit a banknote of a denomination other than the denominations mainly handled at a banking transaction according to a characteristic applied to a work at a counter, such an ATM for a teller needs to process such a special denomination (a foreign currency or the like). At this point, if the ATM for a teller does not have a banknote cassette for handling the special denomination, since a separate work such as separately receiving and storing the banknote of the special denomination by a teller is required, there is a problem in that efficiency of the work of the teller is lowered.

SUMMARY OF THE INVENTION

The present invention has been conceived to solve the aforementioned problems, and it is an object of the present invention to provide a bill-recycling ATM for a teller with a supplementary collection box and a banknote transfer method applied thereto, in which in configuring the ATM for a teller used when the teller performs a banking transaction at a counter, as the supplementary collection box for replenishing or collecting banknotes is provided in the ATM, a large quantity of banknotes can be promptly replenished into or collected from banknote cassettes through the supplementary collection box, and, at the same time, when a settlement work is performed, an automatic settlement can be performed by counting banknotes through a banknote discriminating unit provided on a transporting path in a process of transporting the banknotes stored in the banknote cassettes to the supplementary collection box. In addition, when banknotes are fully stacked in a specific banknote cassette while the ATM is operating, banknotes of a corresponding denomination can be stored in the supplementary collection box instead of the fully stacked banknote cassette, and even when banknotes of special denominations other than major denominations are deposited, the special denominations other than the major denominations can be handled by storing the deposited banknotes of special denominations in the supplementary collection box, thereby enabling operability of the ATM for a teller to be improved and convenience of the teller in performing a banking transaction to be enhanced.

According to an aspect of the present invention for achieving the objects, there is provided a bill-recycling ATM for a teller used when a teller performs a banking transaction at a counter, including: a deposit and withdrawal unit for receiving deposited banknotes or discharging withdrawn banknotes; a banknote discriminating unit for discriminating denominations and normality of the banknotes; a temporary storage unit for temporarily storing the deposited banknotes until a transaction is successfully completed; a plurality of banknote cassettes for storing the banknotes according to denomination; a transporting path for transporting the deposited or withdrawn banknotes along a predetermined path; and a control unit for controlling a process of transporting the banknotes, wherein the ATM is provided with a supplementary collection box configured separately from the plurality of banknote cassettes to replenish banknotes into the plurality of banknote cassettes or collect banknotes from the plurality of banknote cassettes.

As described above, since the bill-recycling ATM for a teller with the supplementary collection box in accordance with the present invention is provided with the supplementary collection box detachably installed in the ATM, when a work of replenishing or collecting banknotes into or from the ATM is performed, a large quantity of banknotes can be replenished into or collected from a banknote cassette through the supplementary collection box, thereby enabling the work of replenishing or collecting banknotes to be automatically and promptly progressed, as compared with a conventional ATM for a teller in which a work of replenishing or collecting banknotes should be manually performed through a deposit and withdrawal unit.

DETAILED DESCRIPTION OF THE PREFERRED EMBODIMENT

Hereinafter, although embodiments of the present invention will be described in detail, the present invention is not limited to the embodiments described below without departing from the spirits of the present invention.

Figure 1:
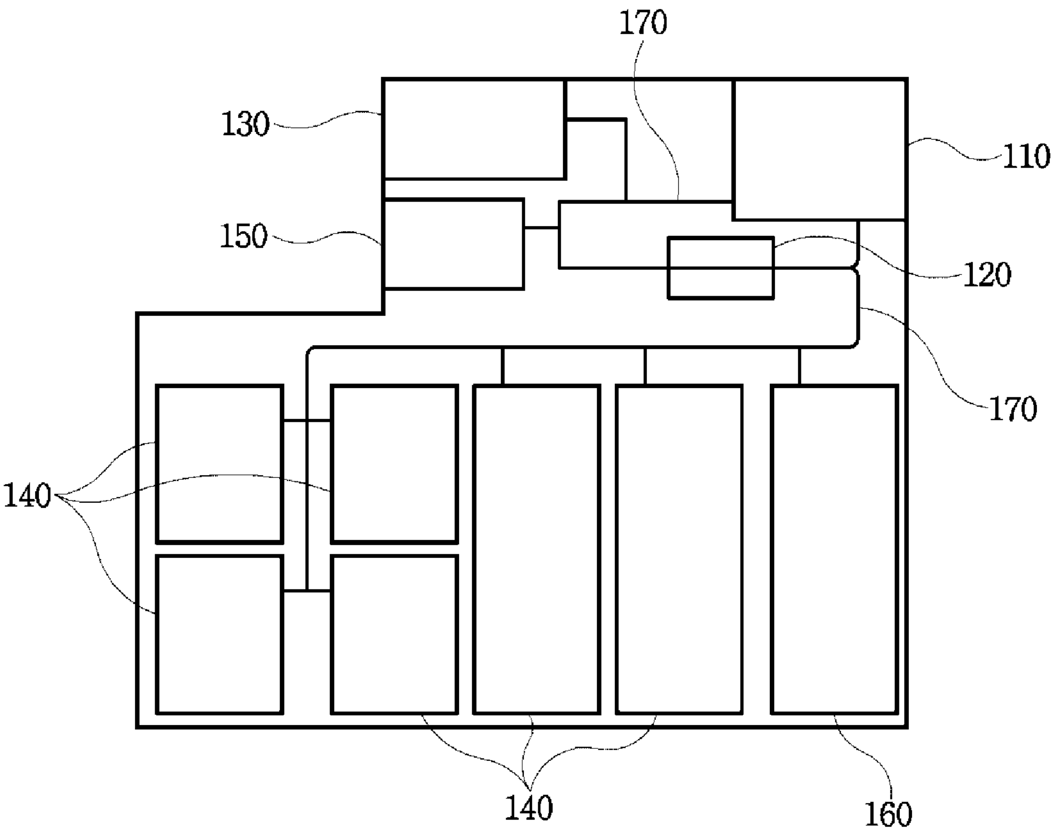
FIG. 1 is a view schematically showing the internal configuration of a bill-recycling ATM for a teller with a supplementary collection box in accordance with one embodiment of the present invention.

FIG. 1 is a view schematically showing the internal configuration of a bill-recycling ATM for a teller with a supplementary collection box in accordance with one embodiment of the present invention.

As shown in FIG. 1, a bill-recycling ATM for a teller with a supplementary collection box in accordance with an embodiment of the present invention is configured to include a deposit and withdrawal unit 110 for receiving deposited banknotes or discharging withdrawn banknotes; a banknote discriminating unit 120 for discriminating denominations and normality of the banknotes; a temporary storage unit 130 for temporarily storing the deposited banknotes until a transaction is successfully completed; a plurality of banknote cassettes 140 for storing the banknotes according to denomination; a reject box 150 for collecting overlapped banknotes or severely damaged banknotes among the banknotes discharged from the banknote cassettes 140; a supplementary collection box 160 for performing an automatic settlement function, an overflow cassette function of storing banknotes of a corresponding denomination instead of a fully stacked banknote cassette, and a special denomination banknote storing function of storing banknotes of a denomination other than major denominations, as well as performing a banknote replenishment/collection function of replenishing banknotes in the plurality of banknote cassettes 140 or collecting banknotes from the plurality of banknote cassettes 140; a transporting path 170 for transporting the deposited or withdrawn banknotes along a predetermined path; and a control unit (not shown) for controlling a process of transporting the banknotes.

That is, the bill-recycling ATM for a teller with the supplementary collection box in accordance with the embodiment of the present invention is advantageous in that as the supplementary collection box for replenishing or collecting banknotes is provided in the ATM, a large quantity of banknotes can be promptly replenished into or collected from banknote cassettes through the supplementary collection box, and, at the same time, when a settlement work is performed, an automatic settlement can be performed by counting banknotes through a banknote discriminating unit provided on a transporting path in the process of transporting the banknotes stored in the banknote cassettes to the supplementary collection box. In addition, when banknotes are fully stacked in a specific banknote cassette while the ATM is operating, banknotes of a corresponding denomination can be stored in the supplementary collection box instead of the fully stacked banknote cassette, and even when banknotes of special denominations other than major denominations are deposited, the special denominations other than the major denominations can be handled by storing the deposited banknotes of special denominations in the supplementary collection box, thereby enabling operability of the ATM for a teller to be improved and convenience of the teller in performing a banking transaction to be enhanced.

Hereinafter, the bill-recycling ATM for a teller with the supplementary collection box in accordance with the embodiment of the present invention will be described. The deposit and withdrawal unit 110 transports banknotes inserted by the teller through the transporting path 170, and when banknotes are withdrawn, the deposit and withdrawal unit 110 discharges banknotes flowing in through the transporting path 170 and provides them to the teller.

The banknote discriminating unit 120 is a device configured to discriminate banknotes of various denominations passing through the transporting path 170 and includes sensors such as a length sensor, a banknote discriminating sensor, and a two-sheet detection unit.

That is, the banknote discriminating unit 120 so configured determines whether or not two-overlapped banknotes pass through the transporting path 170 and discriminates genuineness, denomination and damage of a banknote using the above-described sensors.

The temporary storage unit 130 performs a function of temporarily storing banknotes deposited and discriminated as a normal banknote by the banknote discriminating unit 120 until the deposit transaction is completed.

At this point, it is apparent that the temporary storage unit 130 may be configured in a drum fashion, which the banknotes are stored by winding the transported banknotes on a drum, or in a stack fashion, which the banknotes are stacked inside the temporary storage unit 130 through a plurality of rollers and guides.

The banknote cassettes 140 are storage spaces for storing banknotes and are provided in a plural number to classify and store the banknotes according to denomination. The banknote cassette 140 stacks deposited banknotes which are discriminated as a normal banknote through discrimination of the banknote discriminating unit 120 according to denomination and, when banknotes are withdrawn, performs a recycling function by discharging the banknotes stacked therein toward the deposit and withdrawal unit 110 through the banknote discriminating unit 120.

As described above, the banknote cassettes 140 may be provided as many as the number corresponding to the handled denominations so that banknotes of a variety of handled denominations can be stored according to the characteristics of the ATM. For example, the embodiment shown in FIG. 1 is an ATM for handling dollar banknotes, and six banknote cassettes 140 are provided in the ATM so that banknotes of one dollar, five dollars, ten dollars, twenty dollars, fifty dollars and one hundred dollar can be stored according to denomination, respectively.

The reject box 150 stores two-overlapped banknotes or severely damaged banknotes among the banknotes discharged from the banknote cassettes 140 in a process of withdrawing banknotes.

The supplementary collection box 160 performs a function of replenishing banknotes in the banknote cassettes 140, which performs the recycling function, or collecting banknotes from the banknote cassettes 140.

Such a supplementary collection box 160 is managed by a banknote replenishing/collecting clerk in charge of a banknote replenishing/collecting work. When banknotes in a banknote cassette 140 provided in the ATM are insufficient and need to be replenished or banknotes in a banknote cassette are stacked more than a reference quantity and need to be collected, the teller may call a banknote replenishing/collecting clerk to perform the banknote replenishing/collecting work through the supplementary collection box 160. At this point, in order to increase convenience of the work of the banknote replenishing/collecting clerk, the supplementary collection box 160 may be provided on the door of the ATM to be easily attached to and detached from the ATM.

That is, since a conventional bill-recycling ATM for a teller is configured to replenish or collect banknotes into or from a banknote cassette by the banknote replenishing/collecting clerk through a deposit and withdrawal unit, when a large quantity of banknotes are replenished or collected, the banknotes should be replenished or collected in parts divided as much as the capacity of the deposit and withdrawal unit. Therefore, there is a problem in that the work of replenishing and collecting banknotes is troublesome, and efficiency of the work is lowered since a lot of time is required. However, the bill-recycling ATM for a teller in accordance with the present invention is advantageous in that the work of replenishing and collecting banknotes can be automatically and promptly performed by providing the supplementary collection box 160 which can replenish or collect a large quantity of banknotes into or from the banknote cassette 140 at a time.

At this point, it is apparent that even in the bill-recycling ATM for a teller in accordance with the present invention, the banknote replenishment/collection function can be performed through the deposit and withdrawal unit 110 in some cases when a small quantity of banknotes are replenished into or collected from the banknote cassette 140.

In addition, the supplementary collection box 160 performs an automatic settlement function of performing a settlement by counting the banknotes stored in the plurality of banknote cassettes 140, an overflow cassette function of temporarily storing banknotes transported to a banknote cassette which is full of stacked banknotes if it exists, and a special denomination banknote storing function of storing banknotes of a special denomination when banknotes of the special denomination which does not have a corresponding banknote cassette 140 are deposited, as well as the banknote replenishment/collection function described above.

At this point, the banknote replenishment/collection function, the automatic settlement function, the overflow cassette function and the special denomination banknote storing function using the supplementary collection box 160 described above are performed by the control unit (not shown) of the ATM. The banknote replenishment/collection function and the automatic settlement function may be selectively performed when needed according to a request of the teller, and the overflow cassette function and the special denomination banknote storing function may be performed by automatic control of the control unit (not shown).

That is, when banknotes in the banknote cassette 140 are insufficient and need to be replenished or when banknotes are stacked in the banknote cassette 140 more than a reference quantity and need to be collected, the ATM is operated to replenish banknotes in the banknote cassette 140 or to collect banknotes from the banknote cassette 140 according to a replenishment mode or a collection mode selected by the banknote replenishing/collecting clerk.

In addition, when a settlement of the ATM is needed, according to setting and handling of the ATM by the teller, the automatic settlement function performs the settlement by counting banknotes of each denomination through the banknote discriminating unit 120 and storing the banknotes into the supplementary collection box 160 in a process of recycling the banknotes stored in each of the banknote cassettes 140, and then transporting the stored banknotes to the banknote cassettes 140.

Further, when banknotes are fully stacked in at least any one of the plurality of banknote cassettes 140 provided in the bill-recycling ATM for a teller while the ATM is operating, the overflow cassette function is automatically performed by the control unit (not shown) of the ATM to transport and store banknotes of a denomination to be deposited in the fully stacked banknote cassette 140 into the supplementary collection box 160 starting from a banking transaction performed thereafter.

That is, since the bill-recycling ATM for a teller mainly performs a deposit work due to the nature of the work of the teller at the counter unlike an unmanned ATM which performs withdrawal works in most cases, banknotes of a specific denomination are mainly deposited and intensively stored in a corresponding banknote cassette. Therefore, when the banknotes are fully stacked in the corresponding banknote cassette, a conventional ATM for a teller stops operation and calls a banknote replenishing/collecting clerk to perform a work of collecting the banknotes stacked in the banknote cassette, and thus, there is a problem in that operability of the ATM is lowered. However, the bill-recycling ATM for a teller of the present invention is advantageous in that the ATM can be operated even when there is a fully stacked cassette by substituting the supplementary collection box 160 for an overflow cassette.

In addition, when a banknote of a special denomination for which there is no corresponding banknote cassette 140 is deposited among the banknotes deposited through the deposit and withdrawal unit 110 while the bill-recycling ATM for a teller is operating, the special denomination banknote storing function is automatically performed by the control unit (not shown) of the ATM so as to transport and store the banknote of the special denomination in the supplementary collection box 160, and thus special denominations other than the major denominations can be handled.

That is, since such an ATM for a teller performs a banking transaction between a teller and a customer at a teller's counter of a bank in many cases, the ATM for a teller sometimes handles banknotes of foreign currencies or banknotes of denominations other than the basically handled denominations. At this point, as banknotes of special denominations such as the banknotes of foreign currencies or the banknotes of other denomination are stored in the supplementary collection box 160 when deposited, convenience of the teller in performing a banking transaction can be enhanced.

For example, as shown in FIG. 1 of the embodiment, when the bill-recycling ATM for a teller is provided only with banknote cassettes 140 for handling dollar banknotes, if banknotes of Euro denominations other than the dollar banknotes are deposited, the banknotes of Euro denominations also can be handled by discriminating the banknotes of Euro denominations using the banknote discriminating unit 120 and storing them in the supplementary collection box 160.

At this point, the banknote discriminating unit 120 should be set to discriminate the special denominations, and the special denominations may be set as frequently used denominations other than the major denominations depending on the situation of each financial branch.

Meanwhile, the transporting path 170 is configured to be sequentially connected to the supplementary collection box 160 and the plurality of banknote cassettes 140 provided in a lower part of the ATM passing through the banknote discriminating unit 120 from the deposit and withdrawal unit 110 provided in an upper part of the ATM and to be branched and connected to the reject box 150 and the temporary storage unit 130 provided in the upper part of the ATM, and the transporting path 170 serves to transfer banknotes.

Hereinafter, the operation process of each function of the supplementary collection box of the bill-recycling ATM for a teller with the supplementary collection box in accordance with the embodiment of the present invention will be described based on the configuration of FIG. 1.

Figure 2A:
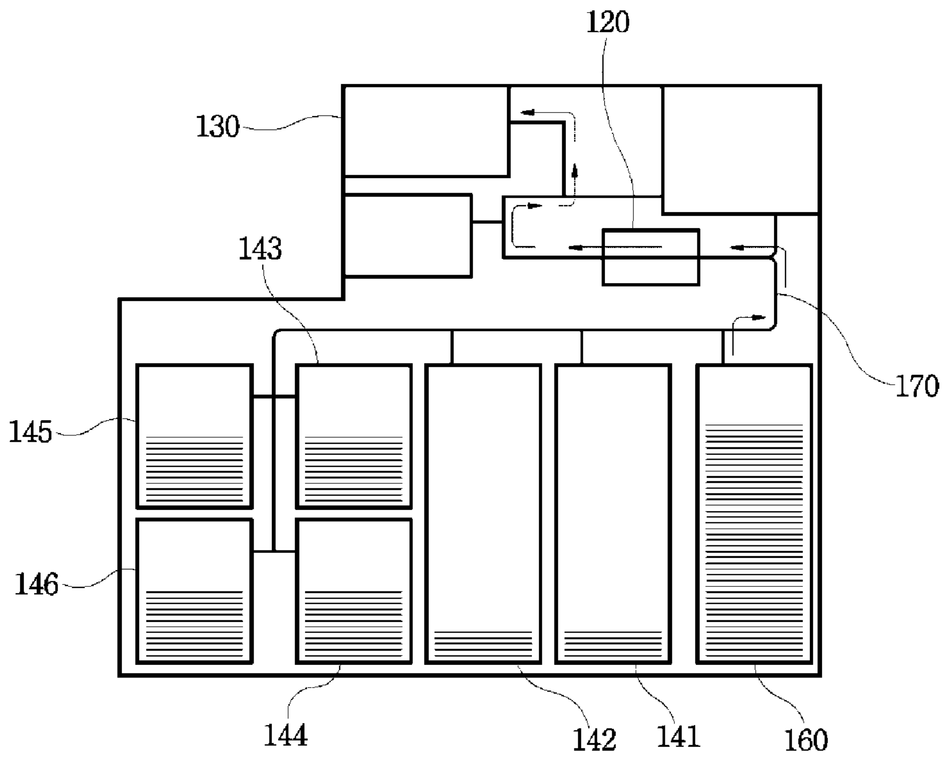
FIGS. 2A and 2B are views showing an operation state when a banknote replenishing function is performed through the supplementary collection box in the bill-recycling ATM for a teller in accordance with the embodiment.
Figure 2B:
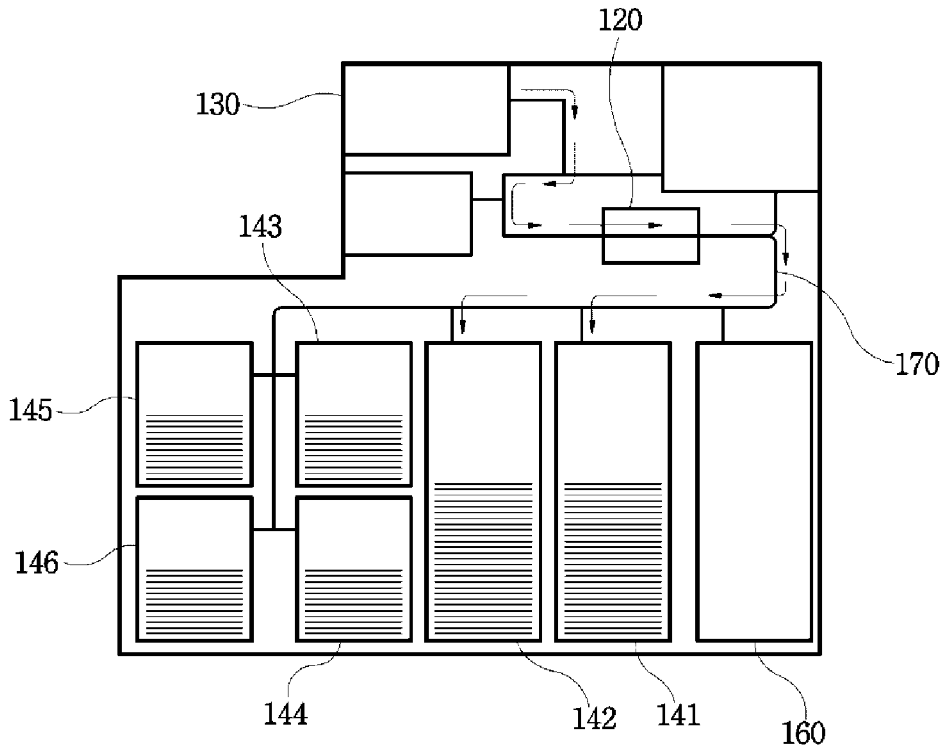
Figure 3A:
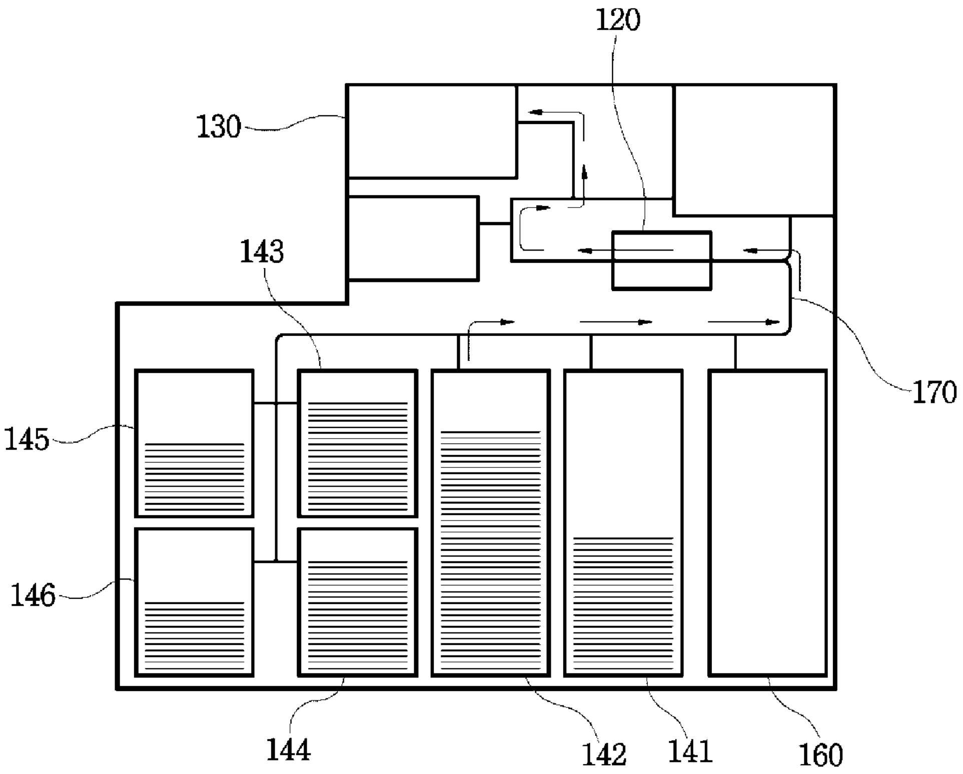
FIGS. 3A and 3B are views showing an operation state when a banknote collecting function is performed through the supplementary collection box in the bill-recycling ATM for a teller in accordance with the embodiment.
Figure 3B:
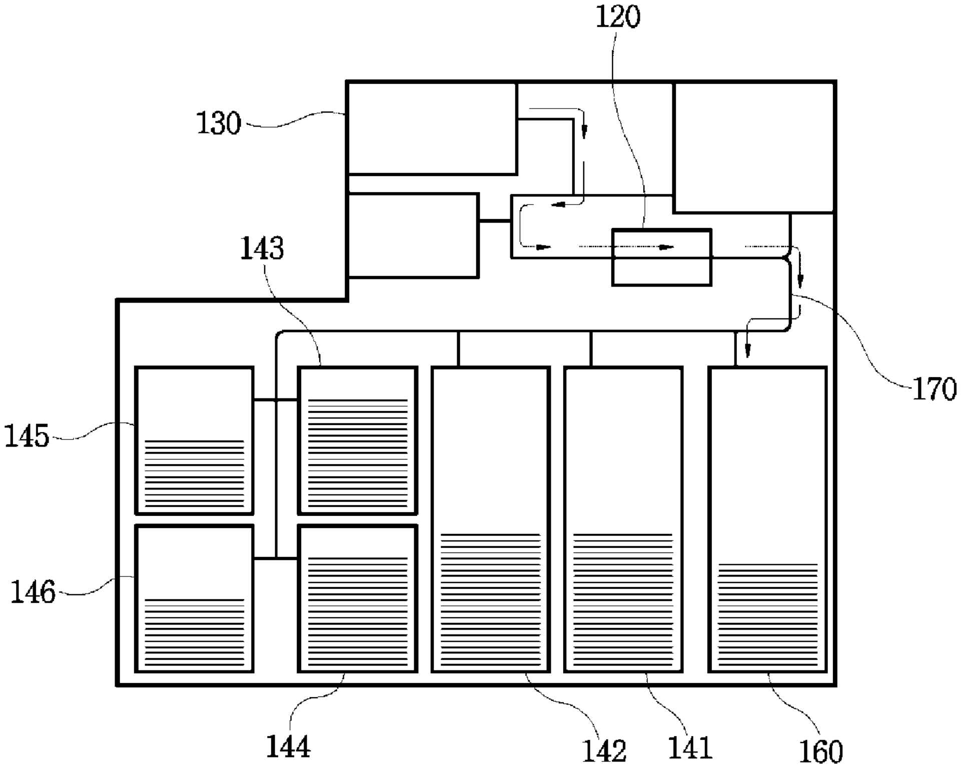

FIGS. 2A and 2B are views showing an operation state when the banknote replenishing function is performed through the supplementary collection box in the bill-recycling ATM for a teller in accordance with the embodiment, and FIGS. 3A and 3B are views showing an operation state when the banknote collecting function is performed through the supplementary collection box in the bill-recycling ATM for a teller in accordance with the embodiment.

When there is a banknote cassette which needs replenishment of banknotes while the bill-recycling ATM for a teller is operating, the teller calls a banknote replenishing/collecting clerk in charge of a banknote replenishing/collecting work to replenish the banknotes, which need to be replenished, in the supplementary collection box described above.

For example, as shown in FIGS. 2A and 2B, when first and second banknote cassettes 141 and 142 among the first to sixth banknote cassettes 141, 142, 143, 144, 145 and 146 need to be replenished with banknotes, banknotes of the denominations corresponding to the first and second banknote cassettes 141 and 142 are replenished in the supplementary collection box 160, and the ATM is operated and the first and second banknote cassettes 141 and 142 are replenished with the banknotes according to the replenishment mode selected by the banknote replenishing/collecting clerk.

That is, as shown in FIG. 2A, when banknotes need to be replenished in the first and second banknote cassettes 141 and 142, the banknotes stored in the supplementary collection box 160 are discharged, and denominations of the banknotes are discriminated and the number of the banknotes are confirmed while the banknotes pass through the banknote discriminating unit 120 along the transporting path 170. At the same time, the banknotes are stored in the temporary storage unit 130 along the transporting path 170.

Subsequently, as shown in FIG. 2B, the banknotes temporarily stored in the temporary storage unit 130 are classified according to denomination based on the discrimination information discriminated by the banknote discriminating unit 120 and transported and replenished in the first banknote cassette 141 and the second banknote cassette 142 along the transporting path 170.

In the process of replenishing banknotes as described above, if the amount of banknotes to be replenished through the supplementary collection box 160 is larger than the banknote storage capacity of the temporary storage unit 130, the banknotes stored in the supplementary collection box 160 are divided and discharged in parts in such a manner that the supplementary collection box 160 discharges the banknotes as much as the banknote storage capacity of the temporary storage unit 130 and stores the banknotes in the temporary storage unit 130 through the transporting path 170, and then, if the banknotes stored in the temporary storage unit 130 are stored in a corresponding banknote cassette 140, the supplementary collection box 160 discharges the banknotes again as much as the banknote storage capacity of the temporary storage unit 130.

For example, when the capacity of the temporary storage unit 130 is two hundred sheets, in order to replenish two thousand sheets of banknotes in the first banknote cassette 141, the banknotes are replenished in the first banknote cassette 141 by discharging two hundred sheets of banknotes from the supplementary collection box 160 to the temporary storage unit 130 ten times.

Then, after the banknotes are replenished in the first and second banknote cassettes 141 and 142, the teller may confirm the denominations and the number of the banknotes replenished through a teller's monitor (not shown) interconnected with the ATM and may perform teller's works through the ATM for a teller.

In the meantime, if there is a banknote cassette which needs collection of banknotes while the bill-recycling ATM for a teller is operating, the banknotes stored in the corresponding banknote cassette are collected through the supplementary collection box.

For example, as shown in FIGS. 3A and 3B, when banknotes more than a reference quantity are stacked in the second to the fourth banknote cassettes 142, 143 and 144 among the first to sixth banknote cassettes 141, 142, 143, 144, 145 and 146 and going to be collected, the ATM is operated and collects the banknotes stored in the second to fourth banknote cassettes 142, 143 and 144 into the supplementary collection box 160 according to the collection mode selected by the banknote replenishing/collecting clerk.

That is, as shown in FIG. 3A, when banknotes are collected from the second banknote cassette 142 among the second to fourth banknote cassettes 142, 143 and 144, the banknotes stored in the second banknote cassette 142 are discharged, and denominations of the banknotes are discriminated and the number of the banknotes are confirmed while the banknotes pass through the banknote discriminating unit 120 along the transporting path 170, and, at the same time, the banknotes are stored in the temporary storage unit 130 along the transporting path 170. Thereafter, as shown in FIG. 3B, the banknotes temporarily stored in the temporary storage unit 130 are transported and collected in the supplementary collection box 160 along the transporting path 170.

Then, the banknotes stored in the third and fourth banknote cassettes 143 and 144 are respectively transported and collected in the supplementary collection box 160 in order in the same manner.

Also in this case, it is apparent that if the amount of the banknotes to be collected from the banknote cassette 140 is larger than the banknote storage capacity of the temporary storage unit 130, the banknote cassette 140 discharges the banknotes in parts divided as much as the banknote storage capacity of the temporary storage unit 130.

Then, after the banknotes are collected in the supplementary collection box 160, the teller may confirm the denominations and the number of the banknotes collected through a teller's monitor (not shown) interconnected with the ATM and may perform teller's works through the ATM for a teller.

Meanwhile, when banknotes are replenished or collected through the supplementary collection box 160 as described above, the replenishment/collection function can be performed while the banknotes transported from the overflowed banknote cassettes, deposited banknotes, or banknotes of special denominations are partially stored in advance in the supplementary collection box 160.

Figure 4A:
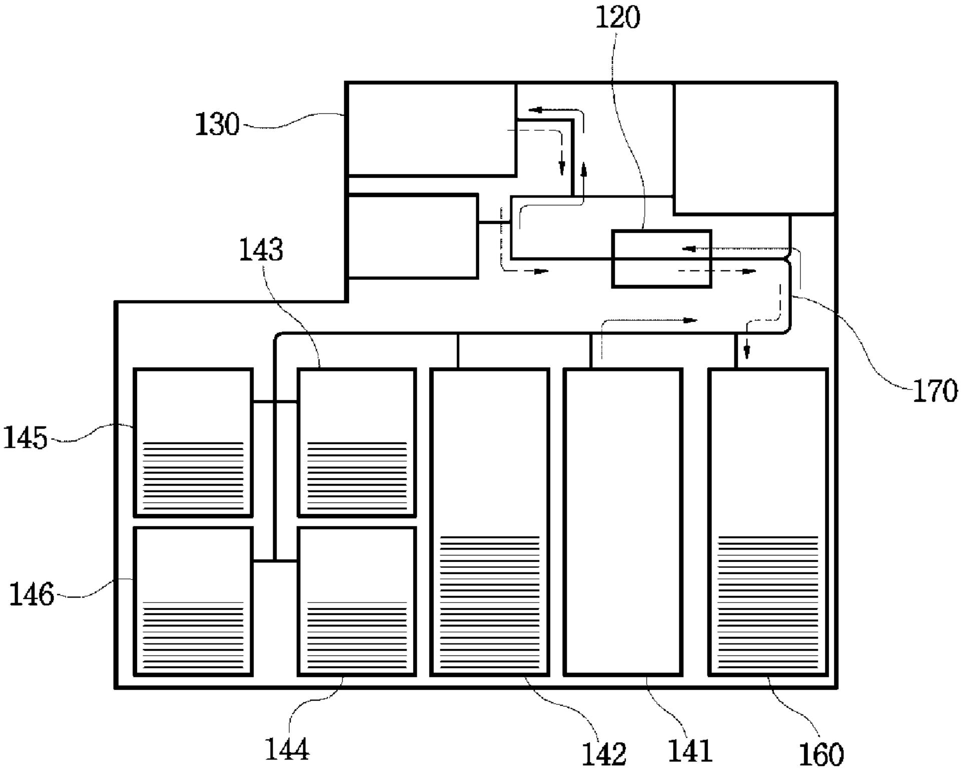
FIGS. 4A and 4B are views showing an operation state when an automatic settlement function is performed through the supplementary collection box in the bill-recycling ATM for a teller in accordance with the embodiment.
Figure 4B:
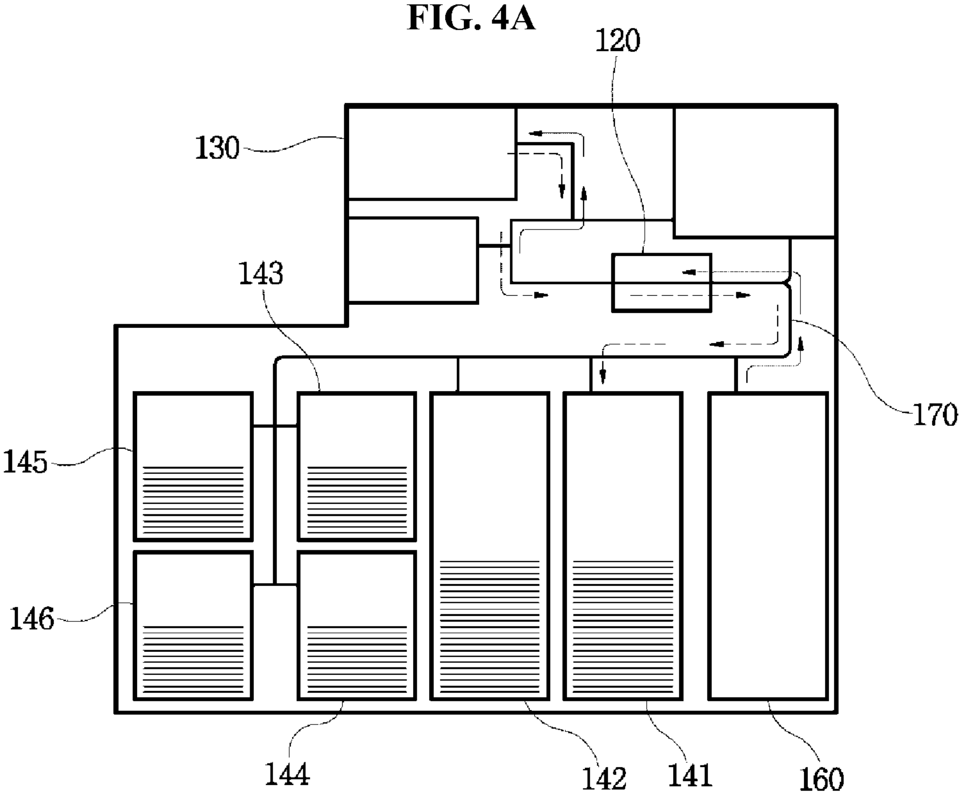

FIGS. 4A and 4B are views showing an operation state when the automatic settlement function is performed through the supplementary collection box in the bill-recycling ATM for a teller in accordance with the embodiment.

When a settlement is performed on the banknotes stored in the plurality of banknote cassettes in the bill-recycling ATM for a teller, the ATM is operated according to setting and handling of the teller, and the settlement is performed by counting banknotes according to denomination through the banknote discriminating unit provided on the transporting path in the process of recycling the banknotes stored in each of the banknote cassettes of the ATM, storing the counted banknotes in the supplementary collection box, and transporting the stored banknotes to corresponding banknote cassettes.

For example, as shown in FIGS. 4A and 4B, when a settlement is performed for the first to sixth banknote cassettes 141, 142, 143, 144, 145 and 146, the settlement is performed by counting banknotes stored in each of the first to sixth banknote cassettes 141 and 146 according to denomination. When the settlement is performed first for the first banknote cassette 141 as shown in FIG. 4A, the banknotes stored in the first banknote cassette 141 are discharged, and denominations of the banknotes are discriminated and the number of the banknotes is confirmed while the banknotes pass through the banknote discriminating unit 120 along the transporting path 170. At the same time, the banknotes are stored in the temporary storage unit 130 along the transporting path 170. Thereafter, the banknotes temporarily stored in the temporary storage unit 130 are transported and stored in the supplementary collection box 160 along the transporting path 170.

Subsequently, if all the banknotes of the first banknote cassette 141 are transported and stored in the supplementary collection box 160, denominations and the number of the banknotes discharged from the first banknote cassette 141 all are confirmed by the banknote discriminating unit 120 provided on the transporting path, and then, as shown in FIG. 4B, the banknotes stored in the supplementary collection box 160 are transported to the first banknote cassette 141 by way of the temporary storage unit 130 again.

Also in this case, if the amount of the banknotes to be transported from the first banknote cassette 141 or the supplementary collection box 160 is larger than the banknote storage capacity of the temporary storage unit 130, the first banknote cassette 141 or the supplementary collection box 160 discharges the banknotes in parts divided as much as the banknote storage capacity of the temporary storage unit 130.

As described above, an amount of money can be calculated by confirming all the denomination and the number of the banknotes stored in the first banknote cassette 141 through the banknote discriminating unit 120 provided on the transporting path, and an amount of money of each of the second to sixth banknote cassettes 142, 143, 144, 145 and 146 also can be calculated by discriminating the denomination of the banknotes stored in the corresponding banknote cassette and confirming the number of the banknotes in the same manner as described above.

Then, if the settlement process on the banknotes stored in the first to sixth banknote cassettes 141, 142, 143, 144, 145 and 146 is completed, the teller may confirm the settlement information through a teller's monitor (not shown) interconnected with the ATM.

Meanwhile, it is apparent that even when an automatic settlement is performed using the supplementary collection box 160 as described above, the automatic settlement function can be performed while the banknotes transported from the overflowed banknote cassettes, deposited banknotes, or banknotes of special denominations are partially stored in advance in the supplementary collection box 160.

Figure 5:
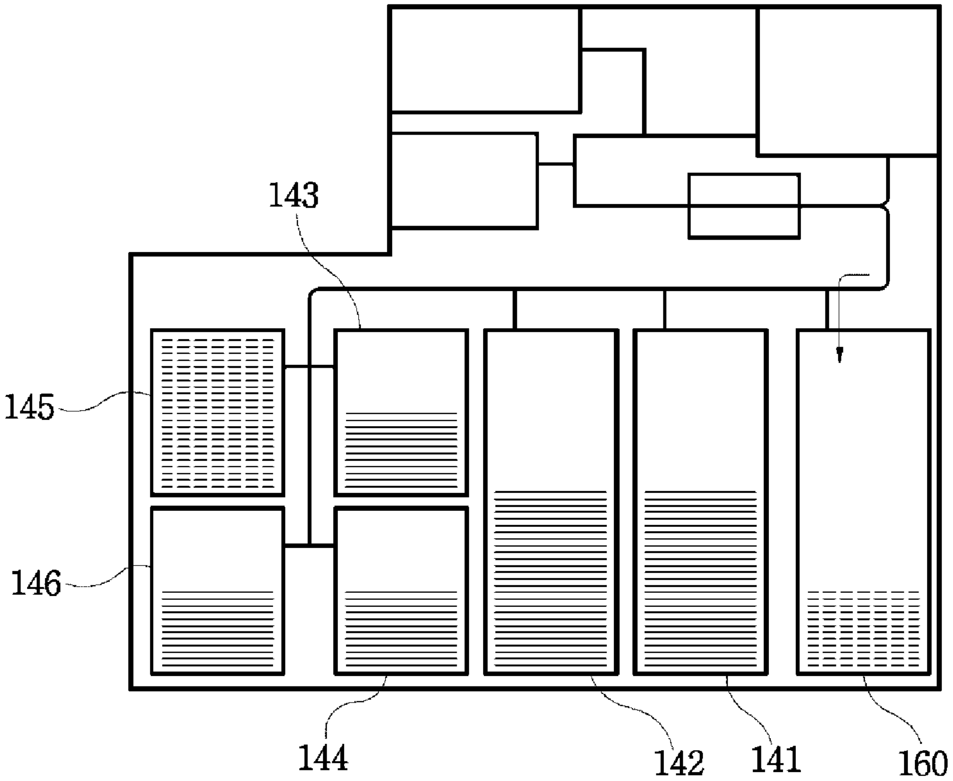
FIG. 5 is a view showing an operation state when an overflow cassette function is performed through the supplementary collection box in the bill-recycling ATM for a teller in accordance with the embodiment.

FIG. 5 is a view showing an operation state when the overflow cassette function is performed through the supplementary collection box in the bill-recycling ATM for a teller in accordance with the embodiment.

When banknotes are fully stacked in any one of the plurality of banknote cassettes while the bill-recycling ATM for a teller is operating, banknotes of a denomination deposited in the fully stacked banknote cassette among the banknotes deposited through a banking transaction performed thereafter are transported and stored in the supplementary collection box.

For example, as shown in FIG. 5, when banknotes are fully stacked in the fifth banknote cassette 145 among the first to sixth banknote cassettes 141, 142, 143, 144, 145 and 146, banknotes of a denomination deposited into the fifth banknote cassette 145 among the banknotes deposited through a banking transaction performed thereafter are transported and stored in the supplementary collection box 160 without stopping the operation of the ATM, so that the supplementary collection box 160 performs the overflow cassette function.

As described above, as the overflow cassette function is performed through the supplementary collection box 160, a banking transaction can be continuously performed without stopping the operation of the ATM even when banknotes are fully stacked in a specific banknote cassette, thereby enabling the operability of the ATM for a teller to be improved.

Figure 6:
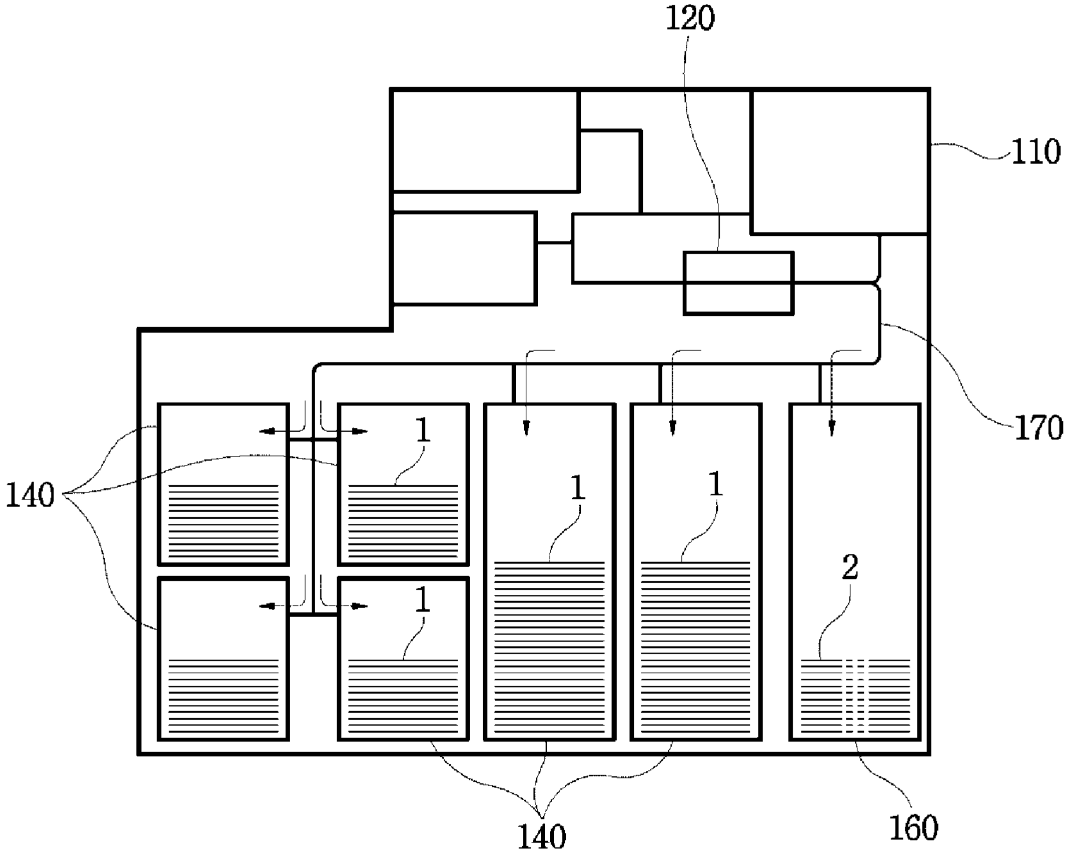
FIG. 6 is a view showing an operation state when a special denomination banknote storing function is performed through the supplementary collection box in the bill-recycling ATM for a teller in accordance with the embodiment.

FIG. 6 is a view showing an operation state when the special denomination banknote storing function is performed through the supplementary collection box in the bill-recycling ATM for a teller in accordance with the embodiment.

As shown in FIG. 6, when a banknote 2 of a special denomination for which there is no corresponding banknote cassette 140 is also deposited among the banknotes deposited through the deposit and withdrawal unit 110 while the bill-recycling ATM for a teller is operating, the banknote discriminating unit 120 provided on the transporting path discriminates the banknote 2 of the special denomination from banknotes 1 of major denominations. Then, the discriminated banknotes are temporarily stored in the temporary storage unit 130, and after the transaction is completed, the banknotes 1 of the major denominations are transported and stored in the corresponding banknote cassettes 140 according to denomination based on the discrimination information of the banknote discriminating unit 120, and the banknote 2 of the special denomination for which there is no corresponding banknote cassette 140 is transported and stored in the supplementary collection box 160.

Accordingly, since the bill-recycling ATM for a teller in accordance with the present invention may handle special denominations other than the major denominations through the supplementary collection box 160, convenience of the teller in performing a banking transaction can be enhanced.

As described above, since the bill-recycling ATM for a teller with the supplementary collection box in accordance with the present invention is provided with the supplementary collection box detachably installed in the ATM, when a work of replenishing or collecting banknotes into or from the ATM is performed, a large quantity of banknotes can be replenished into or collected from a banknote cassette through the supplementary collection box, thereby enabling the work of replenishing or collecting banknotes to be automatically and promptly progressed, as compared with a conventional ATM for a teller in which a work of replenishing or collecting banknotes should be manually performed through a deposit and withdrawal unit.

In addition, when a settlement work of the ATM for a teller is performed, an automatic settlement is performed by counting banknotes through the banknote discriminating unit provided on a transporting path in the process of transporting the banknotes stored in a banknote cassette to a supplementary collection box, thereby enabling the automatic settlement to be performed using the supplementary collection box.

Further, when banknotes are fully stacked in any one of the plurality of banknote cassettes while the bill-recycling ATM for a teller is operating, banknotes of a denomination deposited in the fully stacked banknote cassette among the banknotes deposited through a banking transaction performed thereafter are stored in the supplementary collection box without stopping the operation of the ATM, thereby improving operability of the ATM.

Furthermore, when a banknote of a special denomination for which there is no corresponding banknote cassette is deposited among the banknotes deposited through the deposit and withdrawal unit while the bill-recycling ATM for a teller is operating, the special denomination other than the major denominations can be handled by storing the deposited banknote of the special denomination in the supplementary collection box, thereby enabling convenience of the teller in performing a banking transaction to be enhanced.

What is claimed is:

1. A method for transferring banknotes in a bill-recycling automatic teller machine (ATM), comprising:

transporting first banknotes for replenishing banknote cassettes from a supplementary collection box to a banknote discriminating unit, the supplementary collection box separate from the banknote cassettes;

determining, by a banknote discrimination unit, denominations of the transported first banknotes for replenishing and whether the banknotes for replenishing are normal;

transporting the first banknotes for replenishing from the banknote discrimination unit to a temporary storage unit for temporary storage; and transporting the first banknotes for replenishing from the temporary storage to a corresponding banknote cassette for replenishment of the banknotes according to denomination determined at the banknote discriminating unit;

transporting second banknotes for collection from a banknote cassette to the banknote discrimination unit to determine denomination;

transporting the second banknotes for collection from the banknote discrimination unit to the temporary storage unit; and transporting the banknotes for collection from the temporary storage unit to the supplementary collection box.

2. The banknote transfer method according to claim 1, wherein when at least any one of the plurality of banknote cassettes is full, at least a subset of the banknotes in the full banknote cassette are transported to the supplementary collection box for storage.

3. The banknote transfer method according to claim 1, further comprising storing banknotes of a special denomination in the supplementary collection box.

4. A method of performing settlement in a bill-recycling automatic teller machine (ATM), comprising:

transporting banknotes in a banknote cassette to a banknote discrimination unit;

determining denominations and confirming a number of the banknotes through the banknote discriminating unit;

transporting the banknotes from the banknote discrimination unit to a temporary storage unit for temporary storage;

transporting the banknotes stored in the temporary storage unit to a supplementary collection box separate from the banknote cassette; and transporting the banknotes collected in the supplementary collection box back to the banknote cassettes, wherein the banknotes are divided into units of sheets corresponding to banknote storage capacity of the temporary storage unit for transporting from the banknote cassette to the supplementary collection box.

* * * * *